United States Patent [19]

Conrad

[11] Patent Number: 4,880,112
[45] Date of Patent: Nov. 14, 1989

[54] PET FOOD CONTAINER

[75] Inventor: George R. Conrad, Dunwoody, Ga.

[73] Assignee: General Electric Company, Mt. Vernon, Ind.

[21] Appl. No.: 228,073

[22] Filed: Aug. 4, 1988

[51] Int. Cl.$^4$ .................. B65D 1/34; B65D 25/20; B65D 85/72

[52] U.S. Cl. .................. 206/216; 119/61; 206/457; 206/633; 248/205.3; 220/18

[58] Field of Search .............. 220/18; 206/216, 217, 206/457, 633, 45.28; 229/125.33, 125.35; 119/61, 63; 248/205.3, 359 A

[56] References Cited

U.S. PATENT DOCUMENTS

| | | | |
|---|---|---|---|
| 3,202,131 | 8/1965 | Jones | 119/61 |
| 3,391,847 | 7/1968 | Christine et al. | 229/125.35 X |
| 3,398,877 | 8/1968 | Jacobson | 206/631 X |
| 3,568,875 | 3/1971 | Olan | 119/61 |
| 3,978,553 | 9/1976 | Honig | 206/216 X |
| 4,201,795 | 5/1980 | Yamanaka | 229/125.35 X |
| 4,643,381 | 2/1987 | Levy | 248/500 X |
| 4,656,068 | 4/1987 | Raines | 229/125.35 X |
| 4,716,855 | 1/1988 | Andersson et al. | 119/61 |

Primary Examiner—Stephen M. Hepperle
Attorney, Agent, or Firm—Martin B. Barancik; Joseph T. Eisele

[57] ABSTRACT

A container for pet food and the like comprising a molded plastic tray having a cover or label affixed thereto with a portion of the tray conforming to the profile of a pet. The label wraps around a portion of the tray providing a display or shelving surface and also covers an adhesive strip on the back of the tray which serves to affix it to a surface upon removal of the label.

7 Claims, 1 Drawing Sheet

PET FOOD CONTAINER

FIELD OF THE INVENTION

The present invention is directed toward a container, particularly one which is of the ready to use, disposable type for use in the pet care field.

BACKGROUND AND SUMMARY OF THE INVENTION

There exists a wide assortment of containers for consumer goods on the market. What has become more prevalent in the packaging area is the use of molded plastic containers. The advantages of such packaging is its cost, lighter weight and disposable nature.

In addition, often times it is desirable for convenience and ease of use that the container, in addition to providing a packaging for the goods, also serve as the serving unit. A particularly useful area for such containers is the pet care field.

In this regard, for example, the current practice involves taking a wet food from a can or a dry food from a box or a bag and placing it in a feeding dish for the pet, i.e., dog or cat. Many of such bowls are weighted to provide stability while eating, which would otherwise be subject to sliding during eating. Use of such bowels requires that the proper amount be placed in the bowl and the bowl cleaned after each use.

In addition, from a marketing standpoint, the use of typical cans, boxes or bags lends one product to blend in with that of competing products. While distinctive packaging is desirable, such packaging must be easily handled for stacking on store shelves, displaying and the like.

Accordingly, it is a principal object of the invention to provide for a container for pet food which is disposable, while providing a serving container for the food.

It is another object of the invention to provide for such a container from which a pet can eat without the container sliding about.

A yet further object of the invention is to provide for such a container which is aesthetically pleasing yet capable of being readily handled, stacked and displayed.

The present invention provides for a container in the form of a shallow tray which may be plastic molded for containing pet food. The container includes a lip about its open face, the outer profile of which can be designed to the likeness of a specific pet.

A label is sealed to the lip and includes a member which wraps around one of its sides to provide a flat surface for display or free-standing stacking.

On the back of the tray a double backed strip of tape is applied prior to adding the label and the wrap-around portion thereof serves to overlap the tape. When the label is removed, the tray can be secured by the tape to any flat surface to prevent its movement while the pet eats.

BRIEF DESCRIPTION OF THE DRAWINGS

Thus the aforenoted objects, advantages and others will be obtained by the present invention, the description of which should be taken in conjunction with the drawings, wherein.

DETAILED DESCRIPTION OF THE PREFERRED EMBODIMENT

Figure 1:
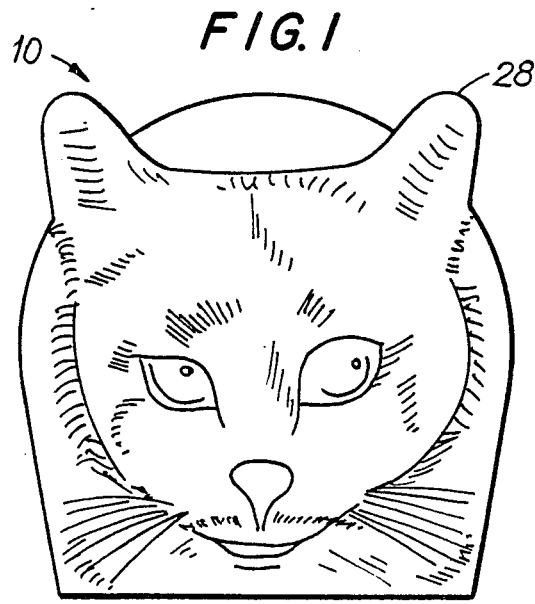
FIG. 1 is a front perspective view of the pet food container incorporating the teachings of the present invention.
Figure 3:
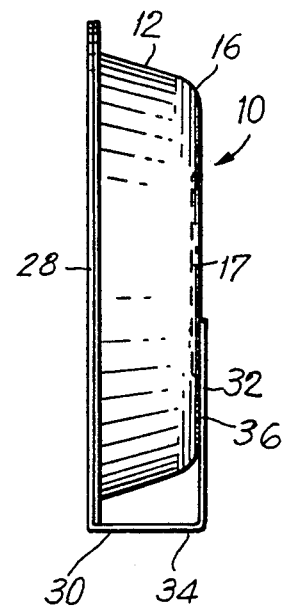
FIG. 3 is a side, partially section view of the pet food container incorporating the teachings of the present invention.

Turning now more particularly to the drawings, there is shown a container 10 comprising a shallow formed tray preferably made out molded plastic. The tray comprises downwardly tapering side walls 12 from an open end or face 14 to a bottom 16 which is generally flat but includes a raised area 17 in its center which, as shown, corresponds to the profile of the side walls 12. About the open-end 14 is a lip 18.

Figure 2:
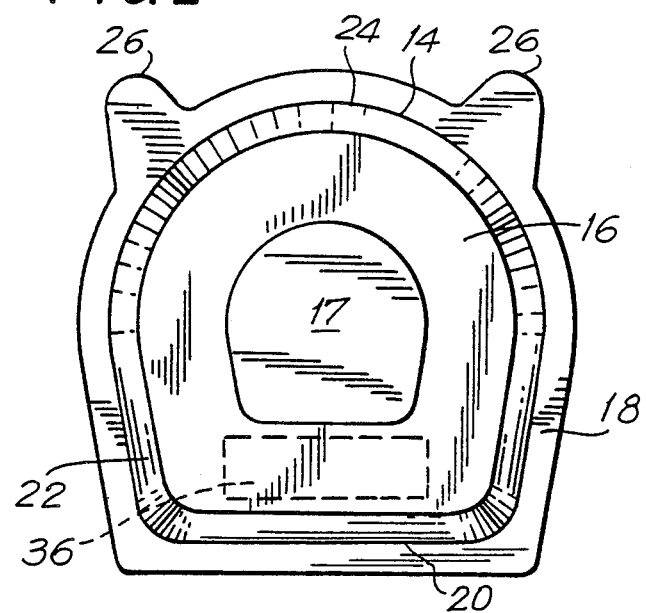
FIG. 2 is a top plan view of the pet food container with a portion thereof shown in phantom, incorporating the teachings of the present invention.

As can be seen in FIG. 2, the lip 18 generally conforms to the shape of the side walls 12 and bottom 16. At the lower end of the tray 10 the side wall 12 comprises a straight side 20 with respective side portions 22 which angle outwardly therefrom. At the upper end of the tray 10, the side wall 12 includes a arcuate portion 24. Two enlarged areas 26 are provided on the lip 18 at the upper end of tray 10 which, in the present example, will correspond to a cat's ears as illustrated in the cover or label 28 shown in FIG. 1. While the label 28 depicts a cat, it should be understood that it may illustrate a dog or a bird, etc., depending upon the intended use for the container and the type of food therein. The profile of the container and particularly lip 18 can accordingly be made to generally conform to the particular animal illustrated on the label.

The label 28 conforms to the profile of the lip 18 and is affixed thereto after the particular pet food is placed in container 10. This may be accomplished by placing an adhesive band position on the lip 18 and/or parameter of the label 28 or by any other means suitable for purpose.

The label 28 which may be made of cardboard or other suitable material include an extended portion 30 at its lower end which wraps down and around the straight side 20 of the tray. Portion 30 then extends upward by way of member 32 so as to form a flat side 34 which allows the container 10 to be displayed or stacked standing in, if desired, an upright position on a store shelf.

Positioned on the back side of bottom 16 is a piece of double sided pressure sensitive tape or adhesive 36. Member 32 of label 28 extends upward to a sufficient degree to cover the adhesive 36.

When the label 28 is removed, the adhesive 36 is exposed and allows the tray to be secured to any flat surface to prevent it from being moved by the pet during eating. Once the feeding is over, the container can merely be discarded.

Thus by the present invention, its objects and advantages are realized and although a preferred embodiment has been disclosed in detail herein, its scope should not be limited thereby; rather, its scope should be determined by that of the appended claims.

What is claimed is:

1. A container for food, such as pet food and the like, comprising: a tray having a side wall and an integrally formed bottom surface for providing a receptacle for pet food, an open end opposite said bottom surface defined by said side wall, a cover detachably secured to said side wall at the open end so as to confine food within the tray, adhesive means located on said bottom for securing the tray to a surface, means detachably covering said adhesive means, and wherein upon removal of the cover access to the food is provided with said adhesive means allowing securing the tray to a surface.

2. The invention in accordance with claim 1, which includes lip portion coupled to the side wall and positioned about the open end of the tray, said cover being affixed to the tray at said lip with said lip being so formed to provide a portion of a profile of a pet illustrated on the cover.

3. The invention in accordance with claim 2, wherein said lip includes a straight portion and an arcuate portion opposite said straight portion and an enlarged portion provided on the arcuate portion to accommodate the portion of the profile illustrated on the cover.

4. A container for food, such as pet food and the like, comprising: a tray having side wall and bottom surfaces for providing a receptacle for pet food, an open end opposite said bottom surface defined by said side wall, a lip portion coupled to the side wall and positioned about the open end of the tray, a cover detachably secured to the tray at said lip so as to confine food within the tray, said lip includes a straight portion and an arcuate portion opposite said straight portion and an enlarged portion provided on the arcuate portion to accommodate the portion of a profile of a pet illustrated on the cover, said cover includes a wrap-around portion which extends around a portion of the tray to provide a flat surface for displaying the container or otherwise stacking of same, adhesive means located on said bottom for securing the tray to a surface, means detachably covering said adhesive means, and wherein upon removal of the cover access to the food is provided with said adhesive means allowing securing the tray to a surface.

5. A container for food, such as pet food and the like, comprising: a tray having side wall and bottom surfaces for providing a receptacle for pet food, an open end opposite said bottom surface defined by said side wall, a cover detachably secured to said side wall at the open end so as to confine food within the tray, said cover includes a wrap-around portion which extends around a portion of the tray to provide a flat surface for displaying the container or otherwise stacking of same, adhesive means located on said bottom for securing the tray to a surface, means detachably covering said adhesive means, and wherein upon removal of the cover access to the food is provided with said adhesive means allowing securing the tray to a surface.

6. The invention in accordance with claim 4, wherein said tray is formed out of plastic and said means detachably covering said adhesive means comprises a portion of the cover such that removal of the cover from the tray provides access to the food while exposing the adhesive means so that the tray can be affixed to a surface.

7. The invention in accordance with claim 5, wherein said tray is formed out of plastic and said means detachably covering said adhesive means comprises a portion of the cover such that removal of the cover from the tray provides access to the food while exposing the adhesive means so that the tray can be affixed to a surface.

* * * * *

UNITED STATES PATENT AND TRADEMARK OFFICE
CERTIFICATE OF CORRECTION

PATENT NO. : 4,880,112

DATED : November 14, 1989

INVENTOR(S) : George Richard Conrad

It is certified that error appears in the above-identified patent and that said Letters Patent is hereby corrected as shown below:

Column 1, line 27, delete "bowels" and add --bowls--.

Signed and Sealed this

Sixth Day of November, 1990

Attest:

HARRY F. MANBECK, JR.

Attesting Officer    Commissioner of Patents and Trademarks